(12) United States Patent
Hsu et al.

(10) Patent No.: US 11,770,732 B2
(45) Date of Patent: Sep. 26, 2023

(54) LINK CONDITION ANNOUNCEMENT METHOD EMPLOYED BY WIRELESS FIDELITY MULTI-LINK DEVICE AND ASSOCIATED APPARATUS

(71) Applicant: MEDIATEK INC., Hsin-Chu (TW)

(72) Inventors: Chien-Fang Hsu, Hsinchu (TW);
Yongho Seok, San Jose, CA (US);
James Chih-Shi Yee, San Jose, CA (US)

(73) Assignee: MEDIATEK INC., Hsin-Chu (TW)

(*) Notice: Subject to any disclaimer, the term of this patent is extended or adjusted under 35 U.S.C. 154(b) by 413 days.

(21) Appl. No.: 17/004,009

(22) Filed: Aug. 27, 2020

(65) Prior Publication Data
US 2021/0076249 A1   Mar. 11, 2021

Related U.S. Application Data

(60) Provisional application No. 62/896,639, filed on Sep. 6, 2019.

(51) Int. Cl.
*H04W 28/02*   (2009.01)
*H04W 76/15*   (2018.01)
*H04L 5/00*    (2006.01)
*H04W 84/12*   (2009.01)

(52) U.S. Cl.
CPC ....... *H04W 28/0236* (2013.01); *H04L 5/0055* (2013.01); *H04W 76/15* (2018.02); *H04W 84/12* (2013.01)

(58) Field of Classification Search
CPC . H04W 28/0236; H04W 76/15; H04W 84/12; H04W 88/10; H04W 72/08; H04W 24/10; H04W 24/08; H04W 72/10; H04W 72/1226; H04L 5/0055; H04L 67/61; H04L 69/28
See application file for complete search history.

(56) References Cited

U.S. PATENT DOCUMENTS

| | | | |
|---|---|---|---|
| 2005/0059396 A1 | 3/2005 | Chuah | |
| 2006/0073827 A1 | 4/2006 | Vaisanen | |
| 2015/0208416 A1* | 7/2015 | Chandra | H04L 5/0048 370/329 |
| 2016/0029248 A1 | 1/2016 | Syed | |

(Continued)

FOREIGN PATENT DOCUMENTS

| | | | | |
|---|---|---|---|---|
| WO | WO-2020005214 A1 * | 1/2020 | | H04W 48/06 |
| WO | WO-2020089709 A1 * | 5/2020 | | H04W 16/14 |

OTHER PUBLICATIONS

Po-Kai Huang, L. Cariou, R. Stacey, D. Bravo, A. Klein, and C. Cordeiro, "Multi-link Operation Framework," IEEE 802.11-19/0773r1, Jul. 1, 2019, IEEE, pp. 1-20.

(Continued)

*Primary Examiner* — Walli Z Butt
(74) *Attorney, Agent, or Firm* — Winston Hsu

(57) ABSTRACT

A link condition announcement method is employed by a wireless fidelity (WiFi) multi-link device (MLD), and includes: obtaining information of a traffic condition of each of a plurality of links owned by the WiFi MLD according to traffic statistics of each of the plurality of links, and transmitting the information of the traffic condition of each of the plurality of links to another WiFi MLD that communicates with the WiFi MLD.

20 Claims, 8 Drawing Sheets

| Element ID | Length | Observation period in Beacon interval | Number of Available links | Link ID | Number of STAs Enable the link | All AC Mean Latency (ms) | All AC 95th Percentile Latency (ms) |
|---|---|---|---|---|---|---|---|

| Highest Priority AC Mean Latency (ms) | Highest Priority AC 95th Percentile Latency (ms) | MSDU Dropping Rate | MSDU Dropping Rate of Highest Priority AC | .... | Optional Subelements |
|---|---|---|---|---|---|

(56) References Cited

U.S. PATENT DOCUMENTS

| | | | |
|---|---|---|---|
| 2016/0044711 A1 | 2/2016 | Lou | |
| 2016/0295557 A1* | 10/2016 | Azarian Yazdi | H04L 1/1671 |
| 2016/0345349 A1* | 11/2016 | Ferdowsi | H04W 72/1268 |
| 2018/0069670 A1* | 3/2018 | Tsai | H04L 5/0096 |
| 2018/0376491 A1* | 12/2018 | Ferdowsi | H04W 72/1268 |
| 2019/0158385 A1* | 5/2019 | Patil | H04W 76/15 |
| 2019/0215905 A1* | 7/2019 | Ryu | H04W 74/004 |
| 2020/0163089 A1* | 5/2020 | Xu | H04W 76/15 |
| 2020/0396625 A1* | 12/2020 | Sethuraman | H04W 24/08 |
| 2021/0368420 A1* | 11/2021 | Cavalcanti | H04W 48/16 |
| 2021/0410185 A1* | 12/2021 | Do | H04W 16/14 |
| 2022/0132572 A1* | 4/2022 | Fang | H04W 74/0808 |

OTHER PUBLICATIONS

X. Yu, P. Navaratnam, K. Moessner, "Performance Analysis of Distributed Resource Reservation in IEEE 802.11e-Based Wireless Networks", Centre for Communication Systems Research, University of Surrey, Guildford, UK, vol. 6, Issue 11, Jul. 24, 2012, p. 1447-1455.

Orlando Cabral et al., "Implementation of Multi-service IEEE 802.11e Block Acknowledgement Policies", IAENG International Journal of Computer Science, 36:1, IJCS_36_1_11, Feb. 17, 2009.

Abhishek Patil et al., Multi-Link Aggregation: Latency Gains, doc.: IEEE 802.11-19/1081r1, Aug. 2019, pp. 1-18, IEEE, USA, XP068153512, Aug. 29, 2019.

* cited by examiner

| Element ID | Length | Observation period in Beacon interval | Number of Available links | Link ID | Number of STAs Enable the link | All AC Mean Latency (ms) | All AC 95th Percentile Latency (ms) |
|---|---|---|---|---|---|---|---|

| Highest Priority AC Mean Latency (ms) | Highest Priority AC 95th Percentile Latency (ms) | MSDU Dropping Rate | MSDU Dropping Rate of Highest Priority AC | ... | Optional Subelements |
|---|---|---|---|---|---|

FIG. 5

| Subelement ID | Length | Link ID | All AC Mean Queuing Latency (ms) | All AC 95th Percentile Queuing Latency (ms) | Highest Priority AC Mean Queuing Latency (ms) | Highest Priority AC 95th Percentile Queuing Latency (ms) |
|---|---|---|---|---|---|---|
| All AC Mean Channel Access Latency (ms) | All AC 95th Percentile Channel Access Latency (ms) | Highest Priority AC Mean Channel Access Latency (ms) | Highest Priority AC 95th Percentile Channel Access Latency (ms) | | | |

FIG. 6

| Subelement ID | Length | Link ID | Second Highest Priority AC Mean Queuing Latency (ms) | Second Highest Priority AC 95th Percentile Queuing Latency (ms) | Second Highest Priority AC Mean Channel Access Latency (ms) | Second Highest Priority AC 95th Percentile Channel Access Latency (ms) | MSDU Dropping Rate of Second Highest Priority AC | ... |
|---|---|---|---|---|---|---|---|---|

FIG. 7

| Subelement ID | Length | Link ID | AC ID | Latency Segment 0 Density | Latency Segment 1 Density | Latency Segment 2 Density | Latency Segment 3 Density |
|---|---|---|---|---|---|---|---|

LINK CONDITION ANNOUNCEMENT METHOD EMPLOYED BY WIRELESS FIDELITY MULTI-LINK DEVICE AND ASSOCIATED APPARATUS

CROSS REFERENCE TO RELATED APPLICATIONS

This application claims the benefit of U.S. provisional application No. 62/896,639, filed on Sep. 6, 2019 and incorporated herein by reference.

BACKGROUND

The present invention relates to wireless communications, and more particularly, to a link condition announcement method employed by a wireless fidelity (WiFi) multi-link device (MLD) and an associated apparatus.

In a WiFi multi-link operation, there exists several links between two MLDs, including one access point (AP) and one non-AP station (STA), that occupy different radio-frequency (RF) bands. These links can operate independently to increase the overall throughput and/or to improve the connection stability. In general, latency is critical for certain applications such as real-time applications. Hence, there is a need for an innovative design which can help a WiFi MLD to select suitable links for a low-latency application.

SUMMARY

One of the objectives of the claimed invention is to provide a link condition announcement method employed by a wireless fidelity (WiFi) multi-link device (MLD) and an associated apparatus.

According to a first aspect of the present invention, an exemplary link condition announcement method employed by a wireless fidelity (WiFi) multi-link device (MLD) is disclosed. The exemplary link condition announcement method includes: obtaining information of a traffic condition of each of a plurality of links owned by the WiFi MLD according to traffic statistics of each of the plurality of links; and transmitting the information of the traffic condition of each of the plurality of links to another WiFi MLD that communicates with the WiFi MLD.

According to a second aspect of the present invention, an exemplary wireless fidelity (WiFi) multi-link device (MLD) is disclosed. The exemplary WiFi MLD includes a processing circuit and a transmit circuit. The processing circuit is arranged to obtain information of a traffic condition of each of a plurality of links owned by the WiFi MLD according to traffic statistics of each of the plurality of links. The transmit circuit is arranged to transmit the information of the traffic condition of each of the plurality of links to another WiFi MLD that communicates with the WiFi MLD.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating an element design according to an embodiment of the present invention.

FIG. 6 is a diagram illustrating a first subelement design according to an embodiment of the present invention.

FIG. 7 is a diagram illustrating a second subelement design according to an embodiment of the present invention.

FIG. 8 is a diagram illustrating a third subelement design according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
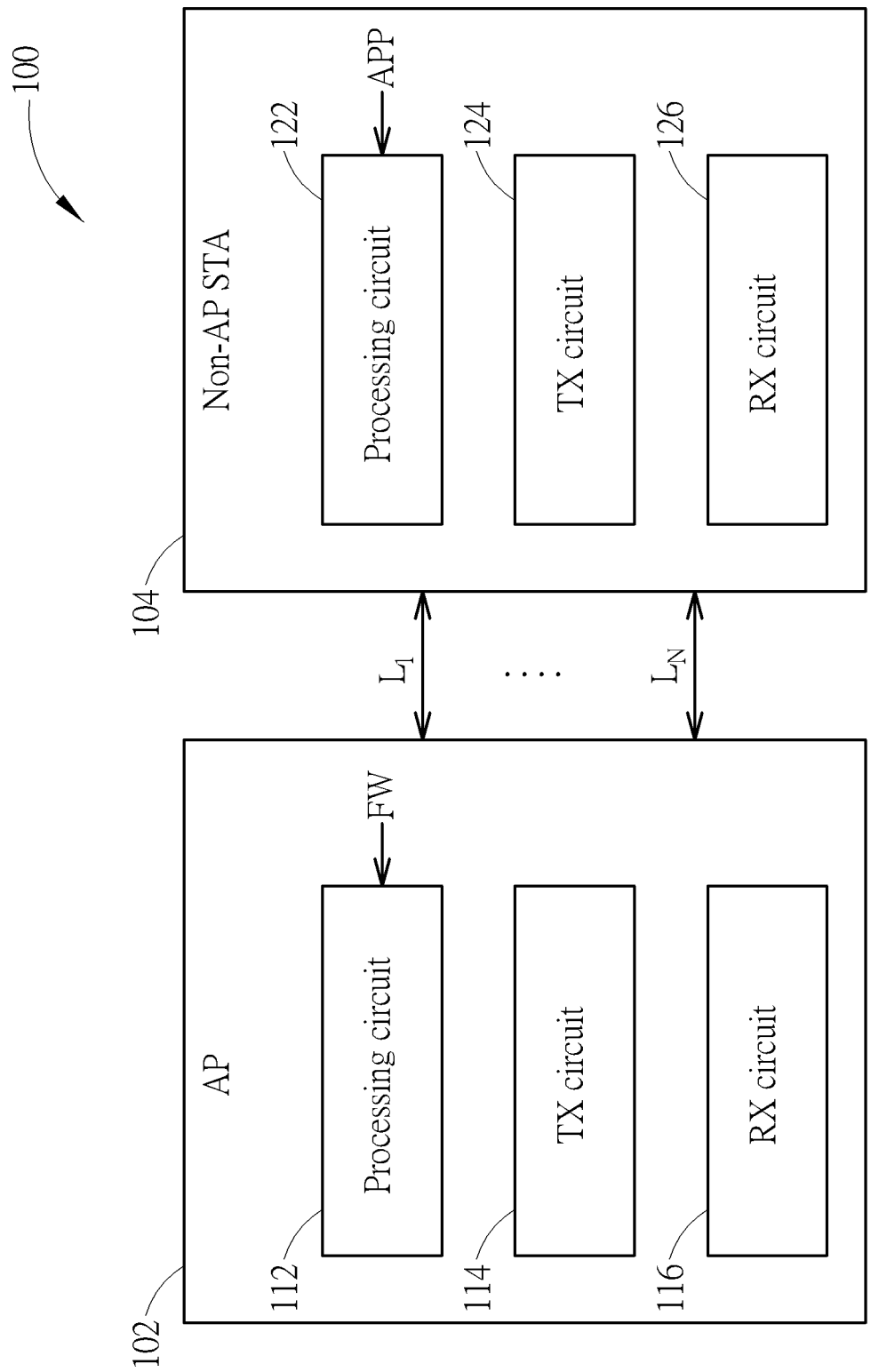
FIG. 1 is a diagram illustrating a wireless fidelity (WiFi) system according to an embodiment of the present invention.

FIG. 1 is a diagram illustrating a wireless fidelity (WiFi) system according to an embodiment of the present invention. For brevity and simplicity, it is assumed that the WiFi system 100 includes one access point (AP) 102 and one non-AP station (STA) 104. In this embodiment, AP 102 and STA 104 are both wireless fidelity (WiFi) multi-link devices (MLDs). For example, AP 102 may own M links $L_1$-$L_M$ at different channels (i.e., RF bands), and may communicate with non-AP STA 104 via N links $L_1$-$L_N$, where M and N are positive integers, N is not smaller than 2, and M is not smaller than N. In some embodiments of the present invention, non-AP STA 104 may be a dual-radio STA (N=2), and AP 102 may be a tri-band AP (M=3). For example, links owned by AP 102 may include a channel in 5 GHz, a channel in 6 GHz, and a channel in 2.4 GHz. However, this is for illustrative purposes only, and is not meant to be a limitation of the present invention. Any WiFi system using the proposed link condition announcement mechanism falls within the scope of the present invention.

The AP 102 may include a processing circuit 112, a transmit (TX) circuit 114, and a receive (RX) circuit 116. The non-AP STA 104 may include a processing circuit 122, a TX circuit 124, and an RX circuit 126. Since the AP 102 is a WiFi MLD that supports M links $L_1$-$L_M$, the TX circuit 114 may be configured to have M TX chains, and the RX circuit 116 may be configured to have M RX chains. Since the non-AP STA 104 is a WiFi MLD that supports N links $L_1$-$L_N$ (N≤M), the TX circuit 124 may be configured to have N TX chains, and the RX circuit 126 may be configured to have N RX chains. The TX circuit 114 of the AP 102 can communicate with the RX circuit 126 of the non-AP STA 104 via links $L_1$-$L_N$. The TX circuit 124 of the non-AP STA 104 can communicate with the RX circuit 116 of the AP 102 via links $L_1$-$L_N$. The processing circuit 122 of the non-AP STA 104 may be implemented by a processor, and an application APP may run on the processing circuit 122. The processing circuit 112 of the AP 102 may be implemented by a processor, and firmware FW of the AP 102 may run on the processing circuit 112.

In accordance with the proposed link condition announcement scheme, a WiFi MLD obtains information of a traffic condition of each of a plurality of links owned by the WiFi MLD according to traffic statistics of each of the plurality of links, and transmits the information of the traffic condition of each of the plurality of links to another WiFi MLD that communicates with the WiFi MLD. For example, the processing circuit 112 of the AP 102 is arranged to obtain information of a traffic condition of each of links $L_1$-$L_M$ owned by the AP 102 according to traffic statistics of each of the links $L_1$-$L_M$, and the TX circuit 114 of the AP 102 is arranged to transmit the information of the traffic condition of each of the links $L_1$-$L_M$ to the non-AP STA 104. The non-AP STA 104 may refer to the link condition information received from downlink to choose suitable links that can be associated with the AP 102 for meeting the latency requirement of the application APP running on the non-AP STA 104. Further details of the proposed link condition announcement scheme are provided as below with reference to the accompanying drawings.

Figure 2:
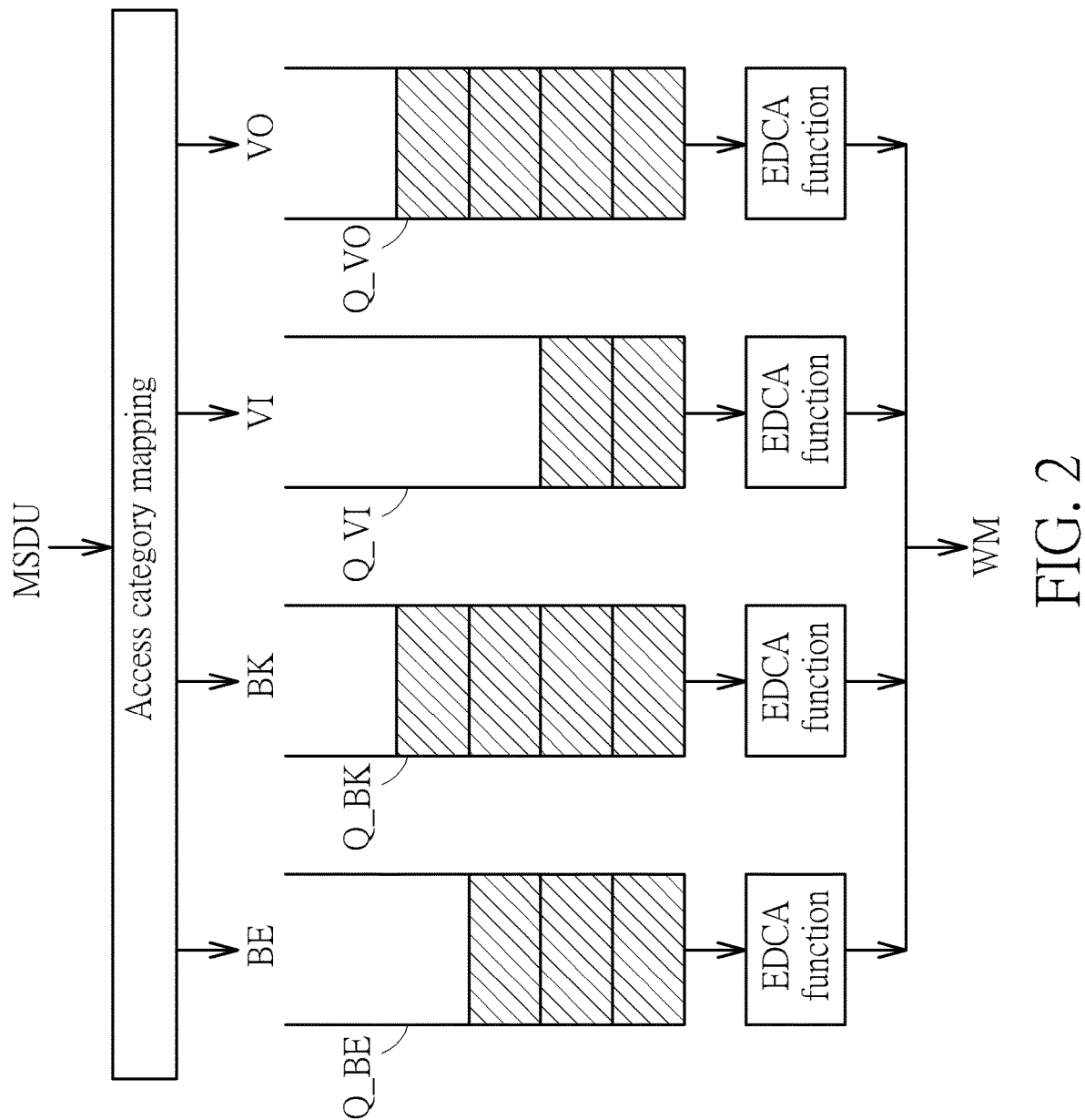
FIG. 2 is a diagram illustrating an example of evaluating the queuing latency according to an embodiment of the present invention.

For example, the traffic statistics of each of the links $L_1$-$L_M$ may include latency statistics. In a first exemplary link latency announcement design, the latency statistics are derived from overall latency that is a sum of queuing latency and channel access latency. When a media access control service data unit (MSDU) belongs to an access category and is dispatched to a queue of the access category, queuing latency is the waiting period needed for permitting the MSDU to access the wireless media (WM). FIG. 2 is a diagram illustrating an example of evaluating the queuing latency according to an embodiment of the present invention. The levels of priority in enhanced distributed channel access (EDCA) are called access categories (ACs). For example, the ACs may include Voice (VO), Video (VI), Best Effort (BF), and Background (BK) from highest priority to lowest priority. Four priority queues Q_BE, Q_BK, Q_VI, Q_VO are established to prioritize data frames, and correspond to four access categories BE, BK, VI, VO mentioned above. An MSDU is classified into one of the access categories BE, BK, VI, VO and then dispatched into one of the priority queues Q_BE, Q_BK, Q_VI, Q_VO. The queuing latency starts from an instant when the MSDU enters a queue of an AC and ends at an instant when the MSDU enters an EDCA function and is ready to access a wireless medium (WM). Hence, the queuing latency depends on how many MSDUs already being in the queue.

Figure 3:
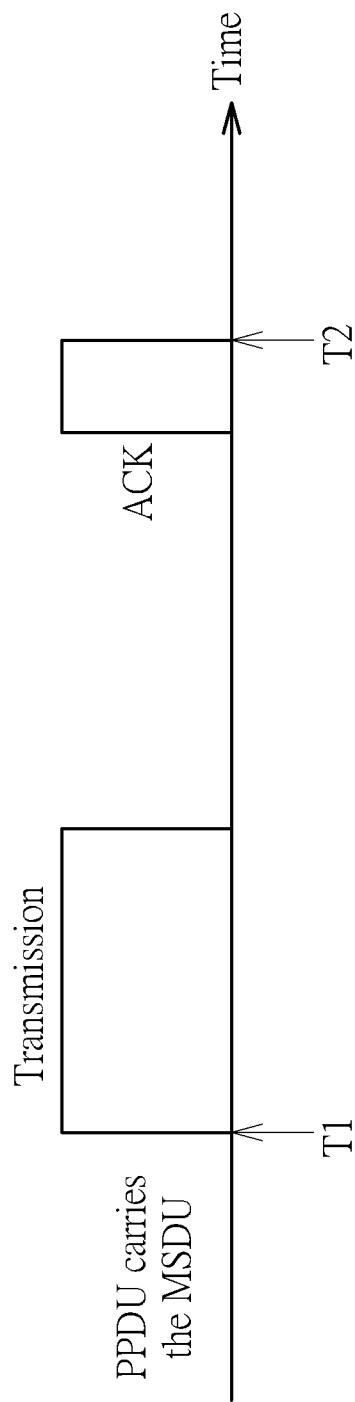
FIG. 3 is a diagram illustrating an example of evaluating the channel access latency according to an embodiment of the present invention.

FIG. 3 is a diagram illustrating an example of evaluating the channel access latency according to an embodiment of the present invention. The channel access latency starts from an instant when the MSDU enters the EDCA function and is ready to access the WM and ends at an instant when the MSDU is sent out to the WM. For example, a timer starts at the instant when the MSDU enters the EDCA function and is ready to access the WM, and counts until the instant when the MSDU is sent out to the WM. It should be noted that the instant when the MSDU is sent out to the WM is not confirmed as an effective end of the channel access latency until an acknowledgment (ACK) frame indicative of successful transmission of the MSDU is received from the non-AP STA 104. As shown in FIG. 3, the MSDU is encapsulated in a physical protocol data unit (PPDU), and the PPDU is sent out to the WM at T1. Hence, T1 is recorded as a temporary timer end. In this example, the PPDU (which carries the MSDU) is successfully received by the non-AP STA 104, and the non-AP STA 104 returns the ACK frame to the AP 102. As shown in FIG. 3, the ACK frame is received by the AP 102 at T2. Hence, after the ACK frame is received at T2, the temporary timer end at T1 is confirmed as an effective end of the channel access latency.

Figure 4:
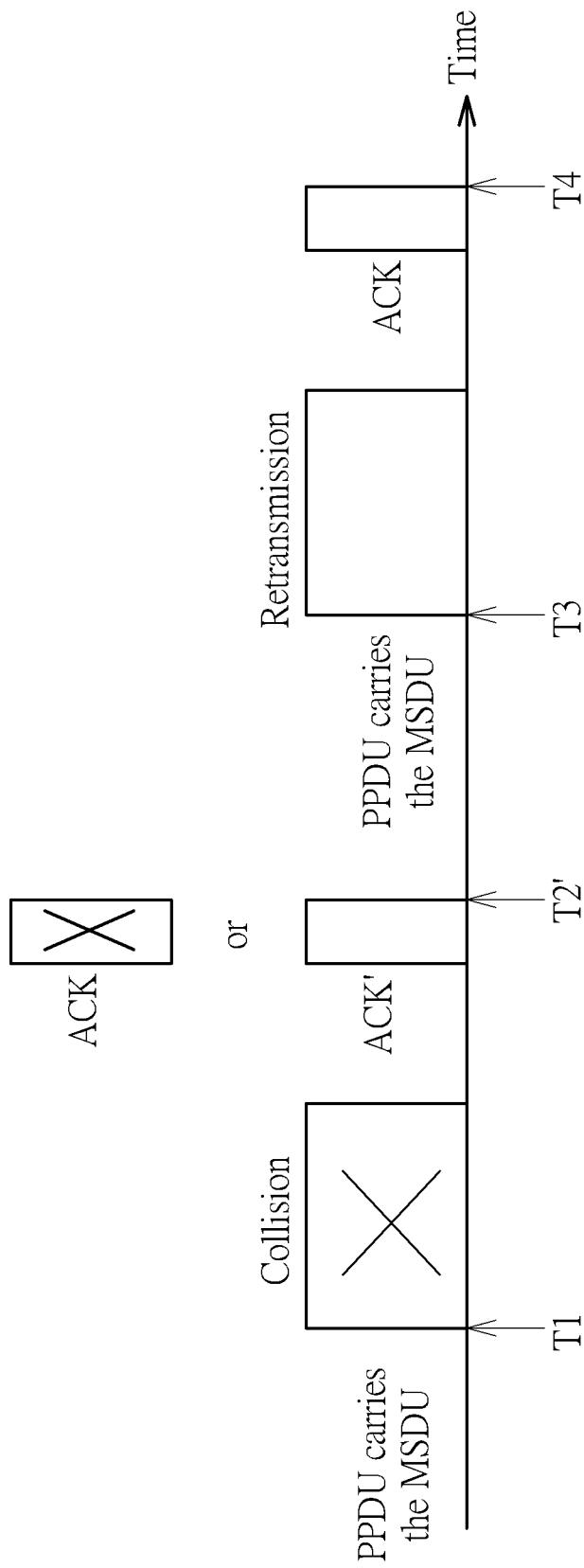
FIG. 4 is a diagram illustrating another example of evaluating the channel access latency according to an embodiment of the present invention.

However, if the MSDU sent from AP 102 is not successfully received by non-AP STA 104, retransmission of the same MSDU is activated by AP 102, and the timer jumps to the retry time when the MSDU is sent again. FIG. 4 is a diagram illustrating another example of evaluating the channel access latency according to an embodiment of the present invention. For example, a timer starts at the instant when the MSDU enters the EDCA function and is ready to access the WM, and counts until the instant when the MSDU is sent out to the WM. As shown in FIG. 4, the MSDU is encapsulated in a PPDU, and the PPDU is sent out to the WM at T1. Hence, T1 is recorded as a temporary timer end. In this example, the MSDU is not successfully received by the non-AP STA 104 due to collision. Since the non-AP STA 104 does not return the ACK frame or the non-AP STA 104 retunes an ACK frame (labeled by ACK') which is received by the AP 102 at T2' and does not contain the acknowledgement of the MSDU, another PPDU (which carries the same MSDU) is transmitted by AP 102 for retransmission of the MSDU. As shown in FIG. 4, the PPDU is sent out to the WM at T3, and the temporary timer end is updated by T3. In this example, the re-transmitted MSDU is successfully received by the non-AP STA 104, and the non-AP STA 104 returns the ACK frame which contains the acknowledgement of the MSDU to the AP 102. As shown in FIG. 4, the ACK frame indicative of successful transmission of the MSDU is received by the AP 102 at T4. Hence, after the ACK frame is received at T4, the temporary timer end at T3 is confirmed as an effective end of the channel access latency.

In a case where the MSDU is partitioned into a plurality of fragments for transmission, the channel access latency starts from an instant when a first fragment of the MSDU enters the EDCA function and is ready to access the WM and ends at an instant when a last fragment of the MSDU is sent out to the WM. Similarly, the instant when the last fragment of the MSDU is sent out to the WM is not confirmed as an effective end of the channel access latency until the ACK frame indicative of successful transmission of the MSDU (particularly, all fragments of the MSDU) is received from non-AP STA 104.

When an MSDU is ready to be sent to the wireless media, the EDCA mechanism and collisions determine how fast the MSDU can be sent to the destination successfully, where the collision depends on if the wireless media is busy or not. Hence, the channel access latency could be long because of low priority AC, frequent collisions, heavy traffic of higher priority ACs, etc.

In a second exemplary link latency announcement design, the latency statistics are derived from overall latency that is a sum of queuing latency, channel access latency, and an ACK delay. The ACK delay is the time period between the transmission instant of the latest PPDU carrying the MSDU and the instant of receiving the ACK frame which is indicative of successful transmission of the MSDU. In other words, the ACK delay starts from the instant when the MSDU is sent out to the WM and ends at the instant when the ACK frame is received from the non-AP STA 104. With regard to the example shown in FIG. 3, the time period from.

T1 to T2 is treated as the ACK delay. With regard to the example shown in FIG. 4, the time period from T3 to T4 is treated as the ACK delay.

Alternatively, the traffic statistics of each of the links $L_1$-$L_M$ may include the aforementioned latency statistics, and may further include timeout dropped media access control service data unit (MSDU) statistics. When the AP 102 performs several retransmission of an MSDU and fails to receive an ACK frame (which is indicative of successful transmission of the MSDU) from the non-AP STA 104 before a retransmission timeout occurs, the MSDU is regarded as one timeout dropped MSDU. The occurrence of timeout dropped MSDUs may imply that the link quality is poor and/or the RX capability is bad. Hence, the timeout dropped MSDU statistics can also be collected at the AP 102 for providing auxiliary link condition information to the non-AP STA 104. For example, the auxiliary link condition information may include the rate of timeout dropped MSDUs of all ACs and/or the rate of timeout dropped MSDUs of each AC.

As mentioned above, information of the traffic condition of each of a plurality of links owned by one WiFi MLD (e.g., AP 102) is transmitted to another WiFi MLD (e.g., non-AP STA 104). In a case where the traffic statistics include latency statistics, information of the traffic condition of each link may include at least one mean latency value and/or at least one $M^{th}$ percentile latency value, where M is a positive integer smaller than 100. A mean latency value is an average value derived from latency values in a given set. Considering a case where an application may weight more on recent latency data and less on past latency data, weighted moving average computation may be used to determine the mean latency value. For example, a weighted moving average may be calculated by using the following formula: Average(n)= Average(n−1)*Alpha+new sample*(1−Alpha), where Alpha is a constant between 1 and 0.

An $M^{th}$ percentile latency value is a latency value that is greater than M % of latency values in a given set. In other words, an $M^{th}$ percentile latency value is the highest value left when the top (100-M) % of a numerically sorted set of collected latency values is discarded. For example, a $95^{th}$ percentile latency value is a latency value that is greater than 95% of latency values in a given set. In other words, a $95^{th}$ percentile latency value is the highest value left when the top 5% of a numerically sorted set of collected latency values is discarded. For brevity and simplicity, the following assumes that each $M^{th}$ percentile latency value is a $95^{th}$ percentile latency value. However, this is for illustrative purposes only, and is not meant to be a limitation of the present invention. In practice, M may be set by any positive integer smaller than 100. By way of example, but not limitation, M may be selected from a group consisting of 90, 95, and 99. In the following, the terms "$95^{th}$ percentile" and "$M^{th}$ percentile" may be interchangeable.

Each mean latency value provided by the information of the traffic condition of each link may be one mean overall latency value, and/or each $95^{th}$ percentile latency value provided by the information of the traffic condition of each link may be one $95^{th}$ percentile overall latency value, where overall latency=queuing latency+channel access latency or overall latency=queuing latency+channel access latency+ ACK delay. By way of example, but not limitation, the traffic condition information of each link may contains element contents, including a mean overall latency value of all ACs, a mean overall latency value of highest priority AC, a $95^{th}$ percentile overall latency value of all ACs, and a $95^{th}$ percentile overall latency value of highest priority AC.

In another case where the traffic statistics include timeout dropped MSDU statistics, information of the traffic condition of each link may include at least one mean MSDU timeout dropped rate. A mean MSDU timeout dropped rate is an average value derived from MSDU timeout dropped rates in a given set, where the MSDU timeout dropped rates may be estimated during different time periods, respectively. The aforementioned weighted moving average computation may be used to determine the mean MSDU timeout dropped rate. By way of example, but not limitation, the traffic condition information of each link may contain element contents, including a mean MSDU timeout dropped rate of all ACs and a mean MSDU timeout dropped rate of highest priority AC.

In yet another case where the traffic statistics include latency statistics and timeout dropped MSDU statistics, the traffic condition information of each link may contain element contents, including a mean overall latency value of all ACs, a mean overall latency value of highest priority AC, a $95^{th}$ percentile overall latency value of all ACs, a $95^{th}$ percentile overall latency value of highest priority AC, a mean MSDU timeout dropped rate of all ACs, and a mean MSDU timeout dropped rate of highest priority AC, as illustrated in FIG. 5. FIG. 5 is a diagram illustrating an element design according to an embodiment of the present invention. An element for a link is identified by an element identifier (ID) and a link ID. In addition to the link latency information, the element may include information of the length, the observation period in beacon intervals, the number of available links, and the number of STAs that enable the link. As shown in FIG. 5, the traffic condition information of each link may further contain one or more optional subelements.

FIG. 6 is a diagram illustrating a first subelement design according to an embodiment of the present invention. A subelement fora link is identified by a subelement ID and a link ID. The subelement contents may include individual latency values of each link, including a mean queuing latency value of all ACs, a $95^{th}$ percentile queuing latency value of all ACs, a mean overall queuing of highest priority AC, a $95^{th}$ percentile queuing latency of highest priority AC, a mean channel access latency value of all ACs, a $95^{th}$ percentile channel access latency value of all ACs, a mean overall channel access value of highest priority AC, and a $95^{th}$ percentile channel access latency of highest priority AC. In addition to the link latency information, the subelement may include information of the length.

FIG. 7 is a diagram illustrating a second subelement design according to an embodiment of the present invention. A subelement fora link is identified by a subelement ID and a link ID. The subelement contents may contain individual latency values of each link, including a mean overall queuing latency value of second highest priority AC, a $95^{th}$ percentile queuing latency value of second highest priority AC, a mean overall channel access value of second highest priority AC, a $95^{th}$ percentile channel access latency value of second highest priority AC, a mean MSDU timeout dropped rate of second highest priority AC, a mean overall queuing latency value of third highest priority AC, a $95^{th}$ percentile queuing latency value of third highest priority AC, a mean overall channel access value of third highest priority AC, a $95^{th}$ percentile channel access latency value of third highest priority AC, a mean MSDU timeout dropped rate of third highest priority AC, a mean overall queuing latency value of fourth highest priority AC, a $95^{th}$ percentile queuing latency value of fourth highest priority AC, a mean overall channel access value of fourth highest priority AC, a $95^{th}$ percentile channel access value of fourth highest priority AC, a mean MSDU timeout dropped rate of fourth highest priority AC, and so on (if there are more access categories). In addition to the link latency information, the subelement may include information of the length.

FIG. 8 is a diagram illustrating a third subelement design according to an embodiment of the present invention. A subelement fora link is identified by a subelement ID and a link ID. The subelement contents may include information of a latency histogram of each AC. For example, the overall latency range of the same AC may be divided into four latency segments, including latency segment 0 (latency≤1 ms), latency segment 1 (1 ms<latency≤5 ms), latency segment 2 (5 ms<latency≤10 ms), and latency segment 3 (10 ms<latency). It should be noted that the range of each latency segment is for illustrative purposes only, and is not meant to be a limitation of the present invention. As shown in FIG. 8, a density value is recorded for each of the latency segments for the same AC, and may use one octet to represent the percentage of overall latency data locates in the corresponding latency segment. In addition to the link latency information, the subelement may include information of the length.

The information of the traffic condition of each link may be carried in a frame that is sent from one WiFi MLD (e.g., AP 102) to another WiFi MLD (e.g., non-AP STA 104). In one exemplary design, the information of the traffic condition of each link is carried by a beacon frame sent from AP 102 to non-AP STA 104. The non-AP STA 104 can do a passive scan by listening to one beacon frame that is sent by AP 102 periodically. The beacon frame may carry the element without subelements.

In another exemplary design, the information of the traffic condition of each link is carried by a response frame that is sent from AP 102 to non-AP STA 104 in response to a request frame generated by non-AP STA 104, where the response frame may include the element with subelements for STA's reference. For example, the non-AP STA 104 can do an active scan by transmitting the request frame (particularly, probe request frame) to AP 102 and listening to the response frame (particularly, probe response frame) from the AP 102. For another example, the non-AP STA 104 may generate the request frame for network analysis purpose, and the AP 102 generates the response frame to carry the element as per STA's request.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A link condition announcement method employed by a wireless fidelity (WiFi) multi-link device (MLD) comprising:
obtaining information of a traffic condition of each of a plurality of links owned by the WiFi MLD according to traffic statistics of said each of the plurality of links; and
transmitting the information of the traffic condition of said each of the plurality of links to another WiFi MLD that communicates with the WiFi MLD, wherein information of traffic conditions of the plurality of links transmitted from the WiFi MLD to said another WiFi MLD comprises a plurality of values indicative of the traffic conditions of the plurality of links.

2. The link condition announcement method of claim 1, wherein the WiFi MLD is an access point (AP), and said another WiFi MLD is a non-AP station (STA).

3. The link condition announcement method of claim 1, wherein the traffic statistics of said each of the plurality of links comprise latency statistics.

4. The link condition announcement method of claim 3, wherein the latency statistics are derived from overall latency, said overall latency comprises queuing latency and channel access latency, said queuing latency starts from an instant when a media access control service data unit (MSDU) enters a queue of an access category (AC) and ends at an instant when the MSDU enters an enhanced distributed channel access (EDCA) function and is ready to access a wireless medium (WM), and said channel access latency starts from an instant when the MSDU enters the EDCA function and is ready to access the WM and ends at an instant when the MSDU is sent out to the WM.

5. The link condition announcement method of claim 4, wherein the instant when the MSDU is sent out to the WM is not confirmed as an effective end of the said channel access latency until an acknowledgment (ACK) frame indicative of successful transmission of the MSDU is received from said another WiFi MLD.

6. The link condition announcement method of claim 5, wherein said overall latency further comprises ACK delay, and said ACK delay starts from the instant when the MSDU is sent out to the WM and ends at an instant when the ACK frame is received from said another WiFi MLD.

7. The link condition announcement method of claim 4, wherein the MSDU is partitioned into a plurality of fragments for transmission, and said channel access latency starts from an instant when a first fragment of the MSDU enters the EDCA function and is ready to access the WM and ends at an instant when a last fragment of the MSDU is sent out to the WM.

8. The link condition announcement method of claim 3, wherein the information of the traffic condition of said each of the plurality of links comprises at least one mean latency value.

9. The link condition announcement method of claim 3, wherein the information of the traffic condition of said each of the plurality of links comprises at least one $M^{th}$ percentile latency value, where M is a positive integer smaller than 100.

10. The link condition announcement method of claim 3, wherein the information of the traffic condition of said each of the plurality of links comprises percentage of latency data locates in each of a plurality of latency segments for a same access category (AC).

11. The link condition announcement method of claim 1, wherein the traffic statistics of said each of the plurality of links comprise timeout dropped media access control service data unit (MSDU) statistics.

12. The link condition announcement method of claim 11, wherein the information of the traffic condition of said each of the plurality of links comprises at least one mean MSDU timeout dropped rate.

13. The link condition announcement method of claim 1, wherein the information of the traffic condition of said each of the plurality of links is carried by a beacon frame sent from the WiFi MLD.

14. The link condition announcement method of claim 1, wherein the information of the traffic condition of said each of the plurality of links is carried by a response frame that is sent from the WiFi MLD in response to a request frame generated by said another WiFi MLD.

15. The link condition announcement method of claim 14, wherein the request frame is a probe request frame, and the response frame is a probe response frame.

16. A wireless fidelity (WiFi) multi-link device (MLD) comprising:
- a processing circuit, arranged to obtain information of a traffic condition of each of a plurality of links owned by the WiFi MLD according to traffic statistics of said each of the plurality of links; and
- a transmit circuit, arranged to transmit the information of the traffic condition of said each of the plurality of links to another WiFi MLD that communicates with the WiFi MLD, wherein information of traffic conditions of the plurality of links transmitted from the WiFi MLD to said another WiFi MLD comprises a plurality of values indicative of the traffic conditions of the plurality of links.

17. The WiFi MLD of claim 16 wherein the WiFi MLD is an access point (AP), and said another WiFi MLD is a non-AP station (STA).

18. The WiFi MLD link of claim 16, wherein the traffic statistics of said each of the plurality of links comprise latency statistics.

19. The WiFi MLD of claim 18, wherein the latency statistics are derived from overall latency, said overall latency comprises queuing latency and channel access latency, said queuing latency starts from an instant when a media access control service data unit (MSDU) enters a queue of an access category (AC) and ends at an instant when the MSDU enters an enhanced distributed channel access (EDCA) function and is ready to access a wireless medium (WM), and said channel access latency starts from an instant when the MSDU enters the EDCA function and is ready to access the WM and ends at an instant when the MSDU is sent out to the WM.

20. The WiFi MLD of claim 19, wherein said overall latency further comprises ACK delay, and said ACK delay starts from the instant when the MSDU is sent out to the WM and ends at an instant when an acknowledgment (ACK) frame indicative of successful transmission of the MSDU is received from said another WiFi MLD.

* * * * *